United States Patent [19]

Duez

[11] 4,257,740
[45] Mar. 24, 1981

[54] SPEED GOVERNING HUB FOR WINDMILL

[76] Inventor: Wayne G. Duez, 6130 Wildacres Rd., Curtice, Ohio 43412

[21] Appl. No.: 3,648

[22] Filed: Jan. 15, 1979

[51] Int. Cl.³ .............................................. F03D 7/04
[52] U.S. Cl. .................................... 416/137; 416/202
[58] Field of Search .................. 416/137, 135 A, 202, 416/139 A, 132 B

[56] References Cited

U.S. PATENT DOCUMENTS

| 216,244 | 6/1879 | Ward | 416/137 X |
| 243,586 | 6/1881 | Logan et al. | 416/202 X |
| 857,376 | 6/1907 | Axelstrom | 416/137 |
| 1,533,467 | 4/1925 | Sargent | 416/137 |
| 1,633,842 | 6/1927 | Bishop | 416/202 X |
| 1,648,837 | 11/1927 | Anderson | 416/202 X |
| 2,050,142 | 8/1936 | White | 416/202 X |
| 2,054,383 | 9/1936 | Ludewig | 416/135 A |
| 2,516,576 | 7/1950 | Jacobs | 416/135 A |
| 4,029,434 | 6/1977 | Kenney | 416/202 X |

FOREIGN PATENT DOCUMENTS

| 734147 | 4/1943 | Fed. Rep. of Germany | 416/137 |
| 868278 | 12/1941 | France | 416/135 A |
| 983048 | 6/1951 | France | 416/135 A |
| 5248 | of 1910 | United Kingdom | 416/137 |

Primary Examiner—Everette A. Powell, Jr.
Attorney, Agent, or Firm—Charles R. Schaub

[57] ABSTRACT

An improved speed governor is disclosed for feathering a plurality of blades on a windmill. Each blade is attached through a rotatable shaft to a support plate which in turn drives an output shaft. Each blade shaft is connected through a control rod to a governor hub which is free to slide axially on the output shaft. A spring biases the governor hub to a position wherein the blades assume a desired initial pitch. As the speed developed by the windmill increases, the force on the blades is applied through the control rods to move the governor hub against the spring. As the governor hub moves the control rods simultaneously and equally change the pitch of the blades to limit the maximum speed of the windmill.

4 Claims, 9 Drawing Figures

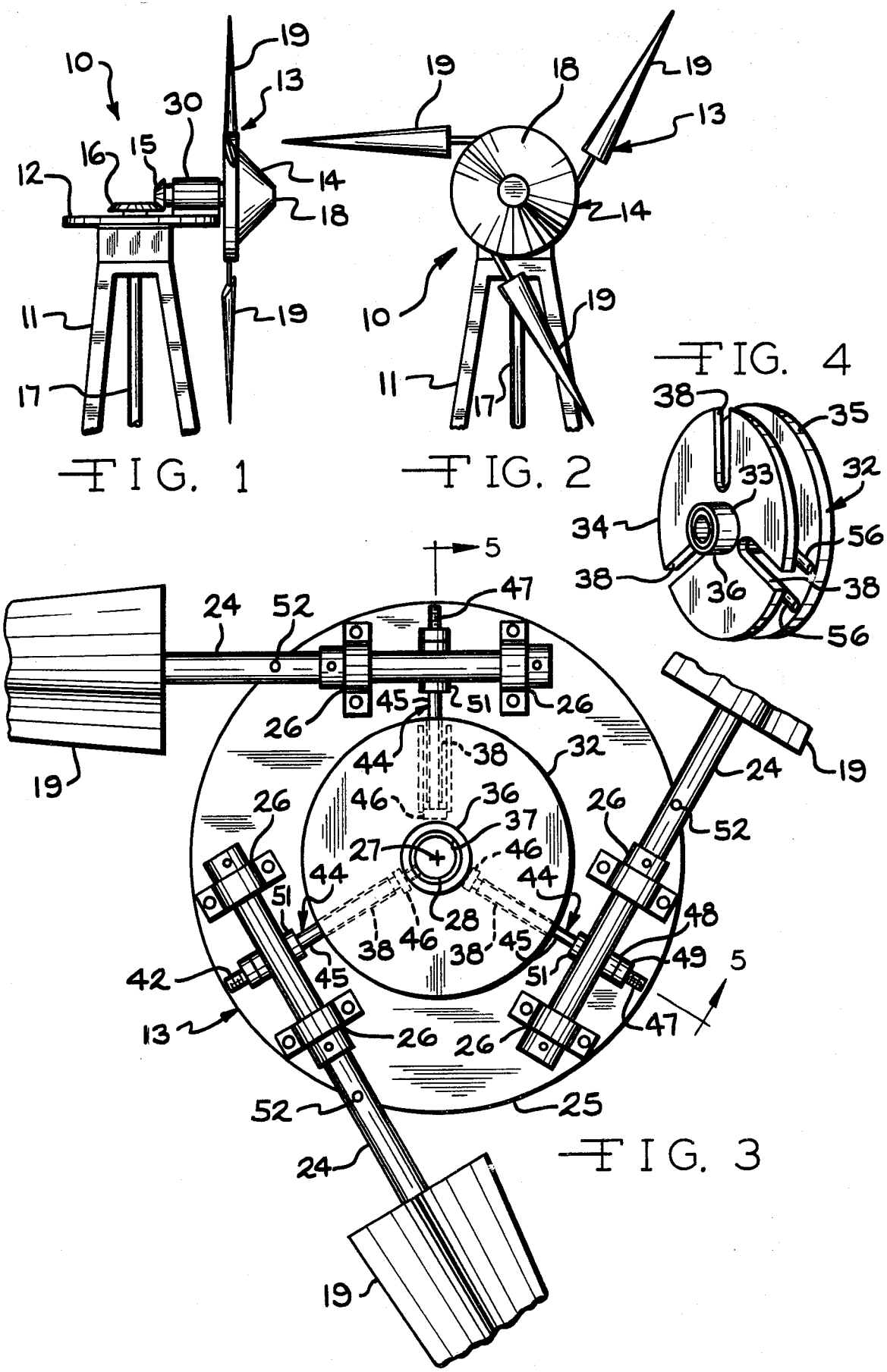

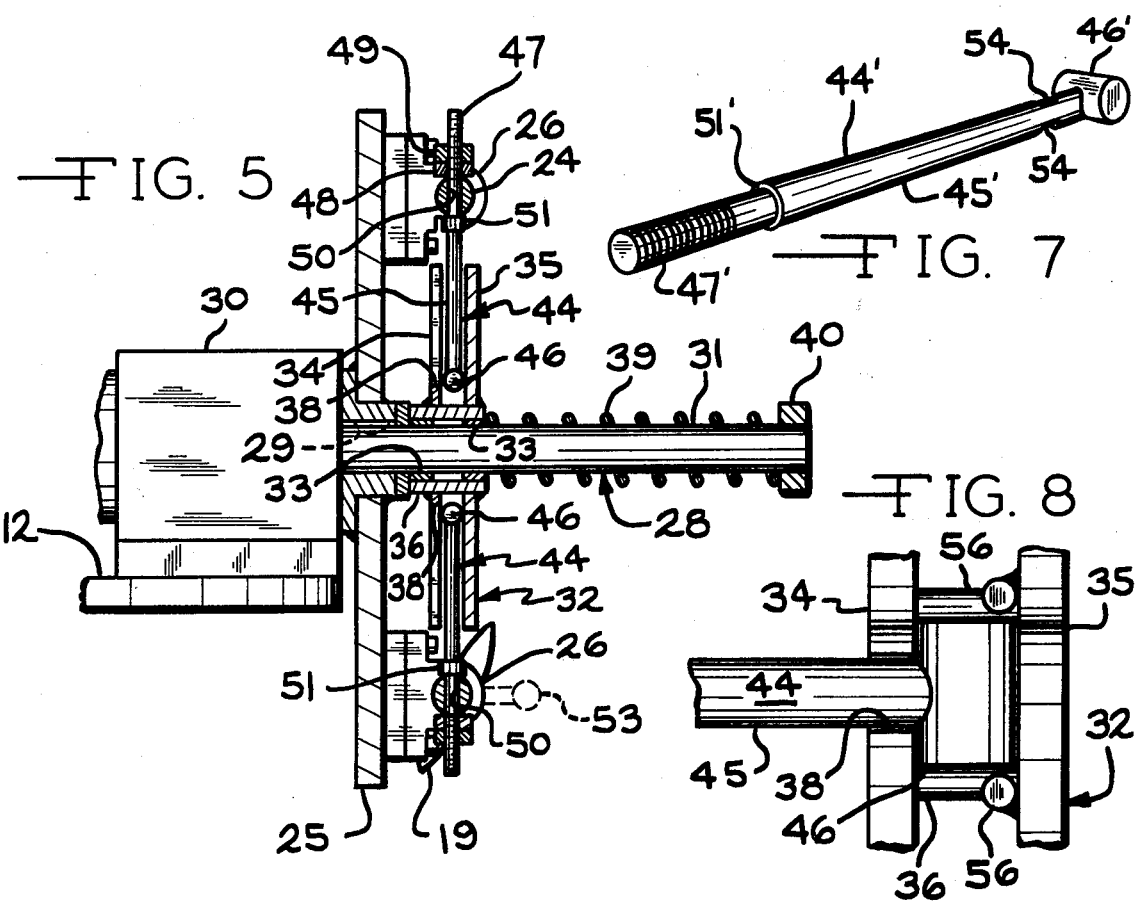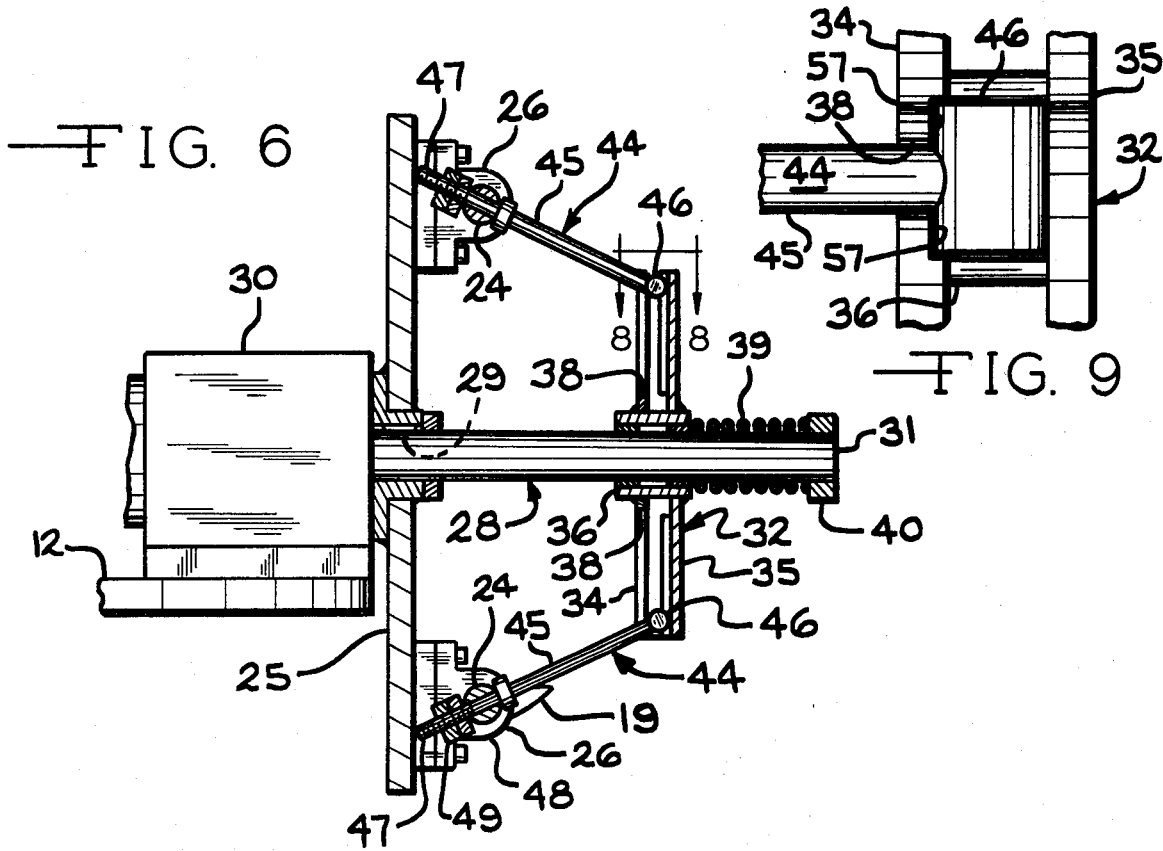

SPEED GOVERNING HUB FOR WINDMILL

BACKGROUND OF THE INVENTION

This invention relates to governors and more particularly to an improved governor for controlling the pitch of blades in a wind motor or windmill.

A common design for a windmill or a wind motor includes two or more blades connected through a hub and a shaft to drive, for example, an electric generator or a pump. One difficulty with driving an electric generator is that the blades of the windmill rotate at varying speeds in different wind conditions. Under very high wind conditions, the blades of the windmill can rotate at a sufficiently high velocity as to destroy either the blades or the internal windmill mechanism, or both. This can create a very dangerous situation where parts from the windmill can be thrown for great distances when the windmill fails in high wind conditions. This type of failure for the windmill severely reduces the suitability for using windmills to produce electrical power in densely populated areas. The development of high rotational speeds by a windmill can result in very expensive and extensive damage to the windmill and to an electric power generator driven by the windmill.

One solution to limiting the speed of windmills during high wind conditions has been through the use of speed governors which feather or change the pitch of the blades as the speed increases. The feathering of the windmill blades reduces the effectiveness of the blades in converting the wind energy into rotational energy and, therefore, limits the speed at which the blades are driven. Some difficulty has occurred in prior art windmill governors in obtaining a simple reliable control which will simultaneously and equally feather all blades to limit the windmill speed. If the blades are not feathered equally and simultaneously, they may be subject to destructive forces under high wind conditions. It is also desirable to have a windmill speed governor which is inexpensive and highly reliable since the windmill may be in operation continuously over a long period of time.

DESCRIPTION OF THE PREFERRED EMBODIMENT

According to the present invention, an improved governor is provided for controlling the maximum speed of a wind motor or windmill. The governor acts to simultaneously and equally feather a plurality of blades as the speed increases to decrease the efficiency of the blades. Each of the blades is attached through a rotatable shaft to a support plate which in turn drives an output shaft. An electric generator, a pump or other device is driven from the output shaft. Each blade shaft is connected through a control rod to a governor hub which is free to slide axially on the output shaft. A spring normally biases the governor hub to a position wherein the blades assume a desired initial pitch. This pitch is preferably selected for maximum blade efficiency. The force of the wind on the blades tends to rotate the blade shafts. This force, which may be augmented with centrifugal force acting upon weights attached to the blades or the blade shafts, is transmitted through the control rods to eventually move the governor hub against the spring at a predetermined rotational speed. As the governor hub moves, the blades rotate to a less efficient pitch and thereby limit the maximum speed at which the windmill is driven. Since each of the individual blades is connected through its respective blade shaft and a control rod to the hub, the pitch of the blades are simultaneously and equally changed when changes in speed cause the hub to move.

Accordingly, it is an object of the invention to provide an improved governor for windmills and wind motors.

Another object of the invention is to provide an improved governor for windmills or wind motors which simultaneously and equally feathers the pitch of a plurality of blades to limit the speed of the blades.

Other objects and advantages of the invention will become apparent from the following detailed description, with reference being made to the accompanying drawings.

BRIEF DESCRIPTION OF THE DRAWINGS

FIG. 1 is a fragmentary side elevational view of a windmill incorporating the speed control governor of the present invention;

FIG. 2 is a fragmentary front elevational view of a windmill incorporating the speed control governor of the present invention;

FIG. 3 is a fragmentary front elevational view showing three windmill blades connected to a speed governor in accordance with the present invention;

FIG. 4 is a perspective view of a governor hub for use in the windmill speed governor of the present invention;

FIG. 5 is a cross sectional view taken along line 5—5 of FIG. 3 and showing the speed governor in its normal position;

FIG. 6 is a cross sectional view similar to FIG. 5, but showing the governor in its maximum speed limiting position;

FIG. 7 is an enlarged perspective view of a control rod for use in the speed governor of the present invention;

FIG. 8 is a cross sectional view taken along line 8—8 of FIG. 6 and showing one method for limiting movement between the control rod and the governor hub of the windmill speed governor of the present invention; and FIG. 9 is a cross sectional view similar to FIG. 8, but showing a modified method for limiting movement between the control rod and the governor hub.

DESCRIPTION OF THE PREFERRED EMBODIMENTS

Turning now to the drawings and particularly to FIGS. 1 and 2, a windmill 10 is shown embodying the principles of the present invention. The windmill 10 generally includes a supporting tower 11, shown in fragmentary, having a top platform 12. A blade assembly 13 including a governor 14 in accordance with the present invention is mounted on the platform 12. Means such as a conventional vane (not shown) is provided for aiming the blade assembly 13 into the wind to achieve maximum efficiency of the windmill 10. The blade assembly 13 is connected to rotate a bevel gear 15 which in turn rotates a second bevel gear 16 attached to a vertical shaft 17. The shaft 17 drives, for example, an electric generator or any other suitable power consuming device. Or, in the alternative, the blade assembly 13 may directly drive an electric generator or other output device. In FIGS. 1 and 2, it will be noted that the governor 14 is enclosed by a cover 18 which directs the wind towards a plurality of blades 19 on the blade assembly 13. The cover 18 increases the efficiency of the windmill 10 by eliminating a flat surface against which the wind would otherwise impinge.

Turning now to FIGS. 3, 4 and 5, details are shown for the governor 14 of the present invention. Each of the blades 19 is fixed on a separate shaft 24 which is in turn rotatably mounted on a support plate 25. The support plate 25 is mounted to rotate the bevel gear 15 shown in FIG. 1 for driving the shaft 17 through the second bevel gear 16 or for driving any other output device. Each of the blade shafts 24 is rotatably mounted on the support plate 25 by means of a pair of spaced bearings 26. The bearings 26 are located on the support plate 13 so that the blades 19 are equally spaced about the support plate 13. Furthermore, the bearings 26 are located so that each blade shaft 24 extends substantially perpendicular to a radius extending from a center 27 of the support plate 25.

As best seen in FIG. 5, the support plate 25 is mounted on and is connected by a key 29 to rotate with a shaft 28. A bearing 30 rotatably supports the shaft 28 on the platform 12 at the top of the tower 11. The bevel gear 15 is attached to one end of the shaft 28 while an opposite end 31 projects through the support plate 25. A governor hub 32 is attached through two bearings 33 to slide on the shaft end 31 in a direction towards and away from the support plate 25. The bearing hub 32 may be free to rotate on the shaft end 31, or it may be keyed to slide only in an axial direction on the shaft end 31.

Details of the governor hub 32 are shown in FIG. 4. The governor hub 32 generally comprises an inner or first plate 34 and an outer or second plate 35 which are substantially parallel, spaced apart and generally circular shaped. The plates 34 and 35 are permanently mounted on a tubular hub 36 to extend concentric with the center 27 of the support plate 25 and the shaft 28. The hub 36 has a central opening 37 in which the bearings 33 are mounted. A plurality of U-shaped slots 38 extend radially outwardly in the first plate 34 from adjacent the hub 36. A separate slot 38 is provided for each of the blades or vanes 19 on the windmill 10 and the slots 38 are positioned to extend perpendicular to the blade shafts 24. The governor hub 32 is positioned on the end 31 of the shaft 28 with the first plate 34 containing the slots 38 facing the support plate 25. A helical compression spring 39 is positioned on the shaft end 31 and is compressed between a nut or end cap 40 on the shaft end 31 and the governor hub 32. A spring 39 biases the governor hub 32 towards the support plate 25.

Each individual blade shaft 24 is connected through a separate control rod 44 to the governor hub 32. Each control rod 44 includes a shaft 45 terminating at a generally cylindrical head 46 which is disposed between the spaced plates 34 and 35. An end 47 of each control rod 44 opposite the head end 46 is threaded to receive a pair of nuts 48 and 49. Each control rod 44 is inserted into an opening 50 in a different one of the blade shafts 24 until a shoulder 51 formed on the control rod 44 abuts the shaft 24. The two nuts 48 and 49 are then threaded onto the end 47 of the control rod 44 and are tightened against one another to lock the control rod 44 onto the blade shaft 24. Each control rod 44 extends radially inwardly and the head 46 is positioned between the spaced plates 34 and 35 of the governor hub 32. The control rods 44 are equally spaced about the hub 32 so that the shafts 45 are in alignment with the slots 38 in the first plate 34 of the governor hub 32. Normally, when the governor hub 32 is biased against the support plate 25, the shafts 45 of the control rods 44 are substantially coplanar and extend radially inwardly towards the center 27 of the shaft 28 and the governor hub 32. When the force of the wind acting on the blades or vanes 19 tends to rotate the blades 19 and attached shafts 24, the control rods 44 are rotated as the shafts 24 rotate. As the control rods 44 rotate, the heads 46 force the governor hub 32 towards the nut or end cap 40 on the shaft 28, thereby compressing the spring 39. As this happens, the heads 46 on the control rods 44 move outwardly with respect to the shafts 28 and the control rod shafts 45 move into the clearance slots 38. As the governor hub 32 moves against the spring 39 due to rotation of the blades 19 and attached shafts 24, the blades 19 simultaneously assume a less efficient pitch. This tends to limit the speed of the blade assembly 13 as the wind velocity increases. At a point of maximum rotation, as illustrated in FIG. 6, the blades 19 may be oriented so as to have either no pitch or a slightly negative pitch. If the blades 19 have no pitch, then no driving force will be applied to the blade assembly 13. On the other hand, if the blades 19 rotate to a position wherein they have a slightly negative pitch, a breaking force will be applied to the blade assembly 13 under extremely high wind conditions. As the blade assembly 13 then slows due to this breaking force, the blades 19 will then move back to a position having a very slight positive pitch and achieve a steady state speed. The point of maximum rotation is reached when the threaded ends 47 of the control rods 44 contact the support plate 25 and the rods 44 are restrained from further rotation in this direction. At the point of maximum rotation the shafts 45 and blades 19 are prevented from rotating any further by the control rods. Also the governor hub 32 is prevented from moving further away from the plate 25 by the control rods 44. As the hub 32 can move no further away from the plate 25 the head 46 on the rods 44 are prevented from disengaging from the hub.

The blades 19 and attached blade shafts 24 and control arms 44 are rotated, at least in part, by the force of the wind acting upon the blades 19. The moment or rotational force applied from the blade 19 to the shaft 24 for a predetermined wind velocity may be established by mounting the blades 19 non-symmetrically on the shafts 24. In other words, the blades 19 are mounted on the shafts 24 so that a greater surface area is distributed to one side of the shaft 24 than to an opposite side. The rotational force applied to the shaft 24 can further be increased by adding centrifugal weights to the shaft 24. One or more apertures 52 may be formed in each blade shaft 24 near or between the bearings 26. The aperture 52 preferably extend substantially parallel to the shaft 28 when the blades 19 are in their normal position with the governor hub 32 positioned adjacent the support plate 25. Weights are then attached to the shafts 24 at the apertures 52, as illustrated by the dashed lines 53 in FIG. 5. As the rotational velocity of the blade assembly 13 increases, centrifugal force tends to throw the weight 53 radially outwardly, in turn applying a rotational force or moment to the blade shafts 24. This rotational moment is in addition to the wind force acting upon the blades 19 and further increases the force applied through the control arms 44 to move the governor hub 32 against the spring 39.

A modified embodiment of a control arm 44' is shown in FIG. 7. The control arm 44' includes a shaft 45' terminating at one end at a head 46' and at an opposite end in a threaded region 47'. The threaded end 47' is of a diameter smaller than the shaft 45' to define a step 51'. The step 51' functions in the same manner as the shoulder 51 on the previously described control rod 44 for determining the spacing between the head 46' and the blade shaft 24 to which the control rod 44' is attached. The control rod 44' is also shown as having two opposing flats 54 cut into the shaft 45'. The flats 54 are adapted to receive a standard wrench for holding the control rod 44' against rotation while being attached to the blade shaft 24. This prevents the head 46' from rotating out of alignment with the spacing between the governor hub plates 34 and 35.

The governor hub 32 has previously been described as being free to move both axially and to rotate on the end 31 of the shaft 28. However, it is necessary that the governor hub 32 be oriented with respect to the support plate 25 such that the shafts 45 of the different control rods 44 align with the grooves 38 in the governor hub plate 34. This may be accomplished either by keying the governor hub 32 to the shaft end 31 or by welding or otherwise attaching guides 56 to one of the governor hub plates 34 or 35 to extend parallel with at least one groove 38 and to define a spacing therebetween for passing the head 46 on a control rod 44, as shown in FIGS. 4 and 8. It is only necessary to provide the guides 56 adjacent one of the U-shaped slots 38 since alignment of one slot 38 will automatically align the other slots 38 with their respective control rods 44. Another method for aligning the governor hub 32 with the support plates 25 is illustrated in FIG. 9 wherein a groove or recess 57 is cut into the plate 34 on either side of at least one U-shaped slot 38 for receiving the head 46 of a control rod 44. When the governor hub 32 is at its normal position abutting the support plate 25 and the control rod shaft 45 is in alignment with the space between the governor hub plates 34 and 35 rather than in the slot 38, the recesses 57 maintain alignment between the governor hub 32 and the control rods 44. Of course, the recesses 57 on either side of the slot 38 may be formed in the plate 35 as a single recess for receiving the control rod head 46 in place of being formed in the plate 34. Other readily apparent methods also may be used for maintaining alignment between the governor hub 32 and the control rods 44. For example, the governor hub 32 may be keyed to the shaft 28 to prevent rotation between the governor hub 32 and the support plate 25 while permitting the governor hub 32 to slide axially on the shaft end 31.

It will be appreciated that various modifications and changes may be made in the above-described preferred embodiment of the governor 14 without departing from the spirit and the scope of the following claims.

What I claim is:

1. An improved windmill speed governor for controlling the speed at which a plurality of wind driven blades rotates a drive shaft comprising a support plate mounted to rotate said drive shaft, a plurality of blade shafts each attached to a separate blade, means rotatably mounting said blade shafts on said support plate with said blade shafts spaced about said drive shaft and each extending generally perpendicular to a radius from said drive shaft, a separate control rod having an end attached to each blade shaft to extend coplanar with the axis of said drive shaft, each of said control rods having a second end extending toward said shaft and terminating at a head, a governor hub positioned to slide axially on said drive shaft towards and away from said support plate, said hub including first and second spaced apart plates, spring means biasing said governor hub towards said support plate, said control rod heads being positioned in the region between said spaced apart plates, such region extending parallel with said support plate, means for maintaining said control rod heads in position in the region between said spaced apart plates, release means in one of said spaced apart plates for passing said control rods as said governor hub slides axially on said drive shaft, said spring means simultaneously biasing said control rod heads to a first position wherein said blades assume a predetermined pitch, said governor hub simultaneously moving said heads to simultaneously rotate said blade shafts in response to a predetermined force upon said blades to modify said predetermined pitch whereby the maximum speed at which said blades rotate said drive shaft is controlled.

2. The windmill speed governor of claim 1 wherein said governor hub has a central hub and said first plate has substantially u-shaped slots that extend from said central hub radially outwardly to said outer periphery of said first plate.

3. The windmill speed governor of claim 2 wherein said control rods are positioned in alignment with said u-shaped slots in said first plate, said control rods moving into said slots as said governor hub slides axially along said drive shaft.

4. The windmill speed governor of claim 3 wherein guide means are positioned on at least one of said plates, said guide means being positioned parallel and in alignment with said sides of said slot in said first plate of said governor hub, said guides acting to align said control rods with said slots in said first plate.

* * * * *